(12) United States Patent
Demchenko

(10) Patent No.: US 11,677,487 B2
(45) Date of Patent: *Jun. 13, 2023

(54) NETWORK INTERFACE WITH TIMESTAMPING AND DATA PROTECTION

(71) Applicant: Rambus Inc., San Jose, CA (US)

(72) Inventor: Maksym Demchenko, Eindhoven (NL)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/361,079

(22) Filed: Jun. 28, 2021

(65) Prior Publication Data

US 2021/0391938 A1 Dec. 16, 2021

Related U.S. Application Data

(63) Continuation of application No. 16/552,919, filed on Aug. 27, 2019, now Pat. No. 11,050,500.

(30) Foreign Application Priority Data

Aug. 28, 2018 (EP) ..................................... 18191268

(51) Int. Cl.
*H04J 3/06* (2006.01)
*H04L 9/40* (2022.01)
*H04L 1/00* (2006.01)
*H04L 47/28* (2022.01)

(52) U.S. Cl.
CPC .......... *H04J 3/0667* (2013.01); *H04J 3/0697* (2013.01); *H04L 1/0061* (2013.01); *H04L 1/0083* (2013.01); *H04L 47/28* (2013.01); *H04L 63/0428* (2013.01); *H04L 63/162* (2013.01)

(58) Field of Classification Search
CPC ..... H04J 3/0667; H04J 3/0697; H04L 1/0061; H04L 1/0083; H04L 47/28
See application file for complete search history.

(56) References Cited

U.S. PATENT DOCUMENTS

| 9,929,928 | B1 | 3/2018 | Dekoos | |
| 11,050,500 | B2 * | 6/2021 | Demchenko | .......... H04L 1/0061 |
| 2012/0314717 | A1 | 12/2012 | Nakamura | |

(Continued)

OTHER PUBLICATIONS

Extended European Search Report for Application No. 18191268.4, dated Mar. 7, 2019, 8 pages.

*Primary Examiner* — Siming Liu
(74) *Attorney, Agent, or Firm* — Lowenstein Sandler LLP

(57) ABSTRACT

In a general aspect, a network transmission interface can include, within an egress data path, a physical coding sublayer (PCS) operating in a constant bitrate domain for transmitting data frames on a network link; a timestamp unit configured to insert timestamps in payloads of the frames; a transmission media access control (MAC) unit located at a boundary between the constant bitrate domain and a variable bitrate domain, configured to receive the frames at a variable bitrate, encapsulate the frames, and provide the encapsulated frames at a constant bitrate; a MAC layer security unit located downstream from the timestamp unit, configured to sign and optionally encrypt the payloads and expand each frame with a security tag and an integrity check value (ICV). The timestamp unit and the MAC layer security unit (26b) can both operate in the constant bitrate domain.

20 Claims, 6 Drawing Sheets

(56) References Cited

U.S. PATENT DOCUMENTS

2013/0114601 A1   5/2013   Branscomb
2013/0117856 A1   5/2013   Branscomb
2014/0092918 A1   4/2014   Jost

* cited by examiner

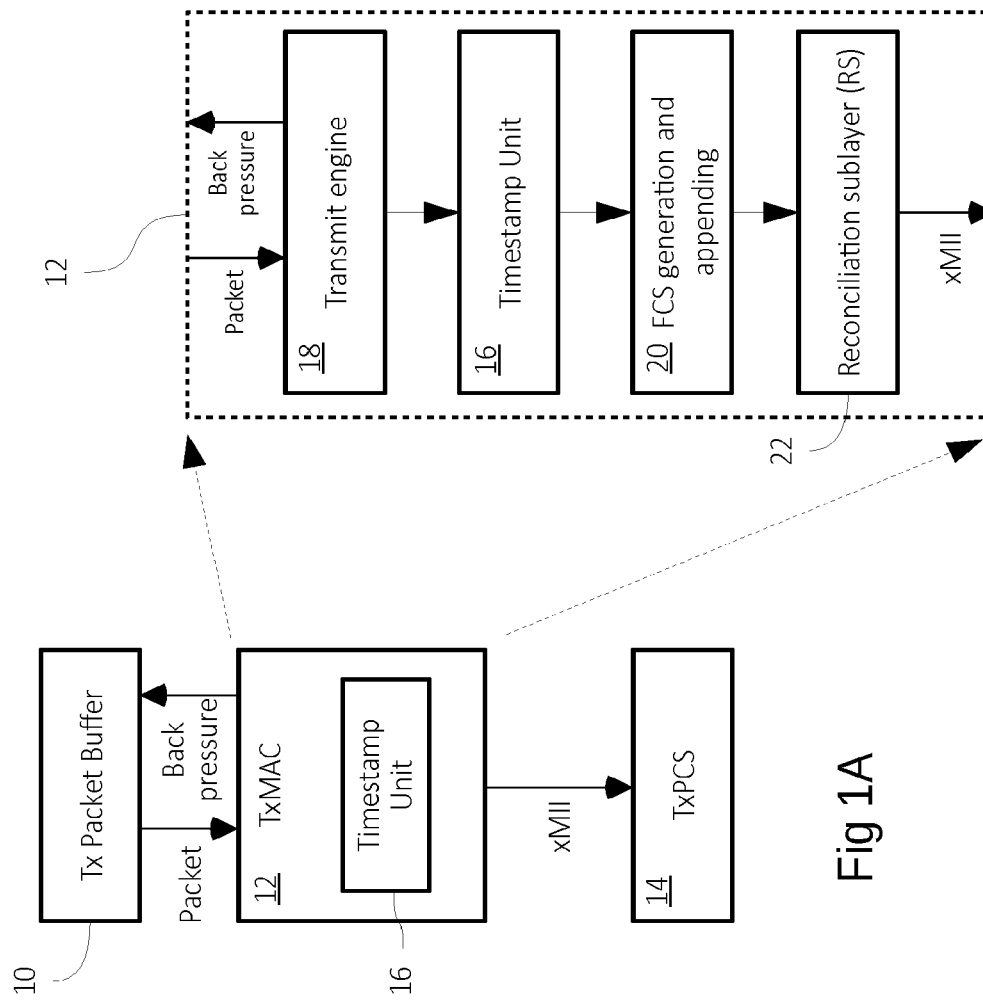

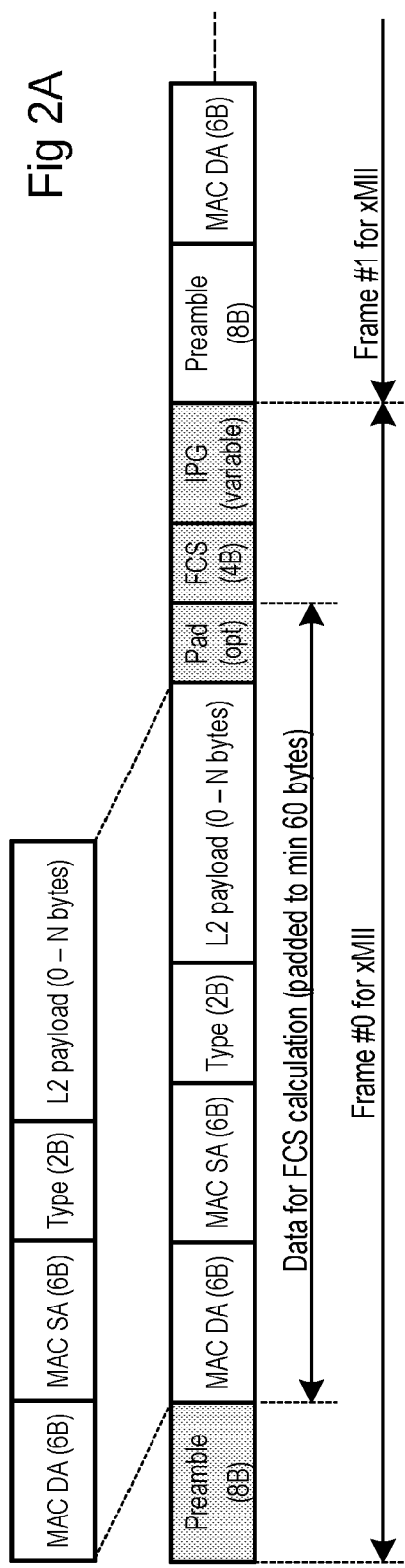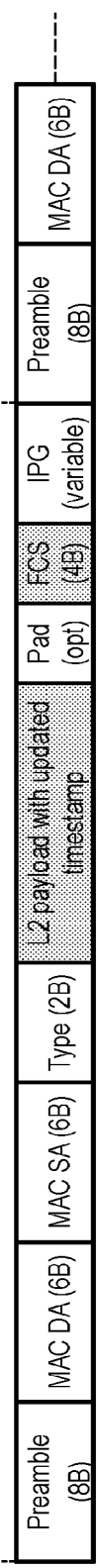
Fig 2A
Fig 2B

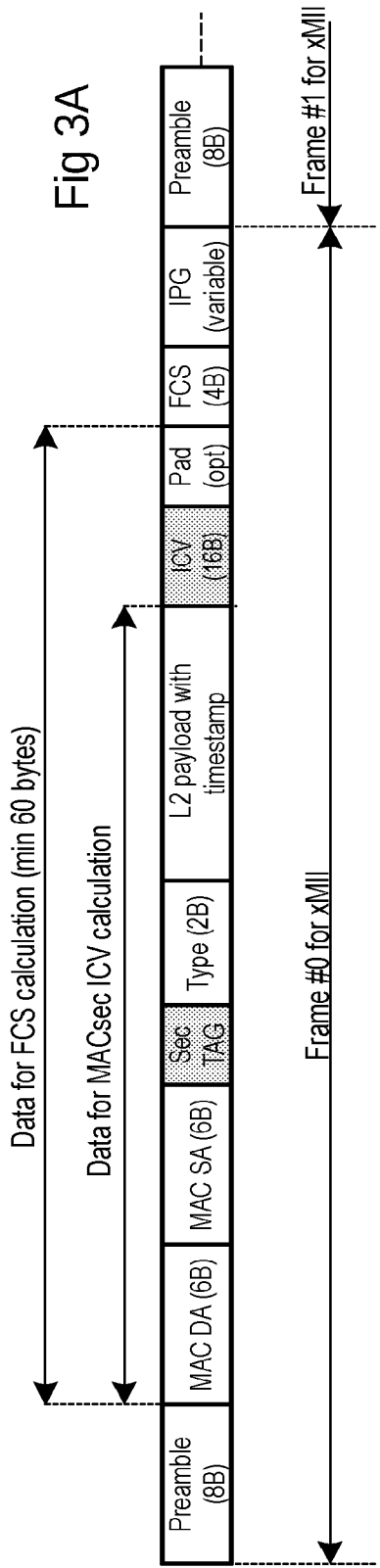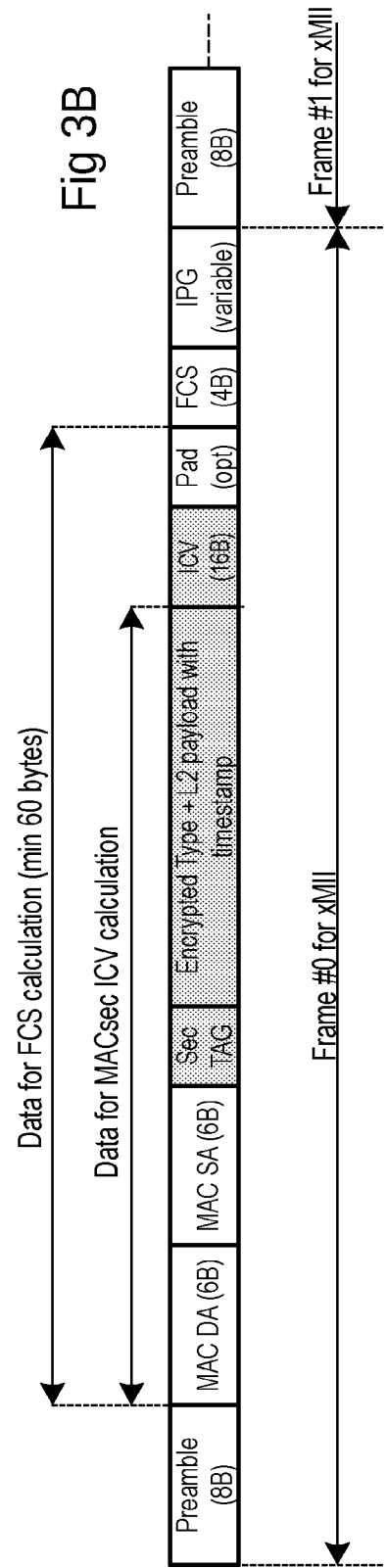

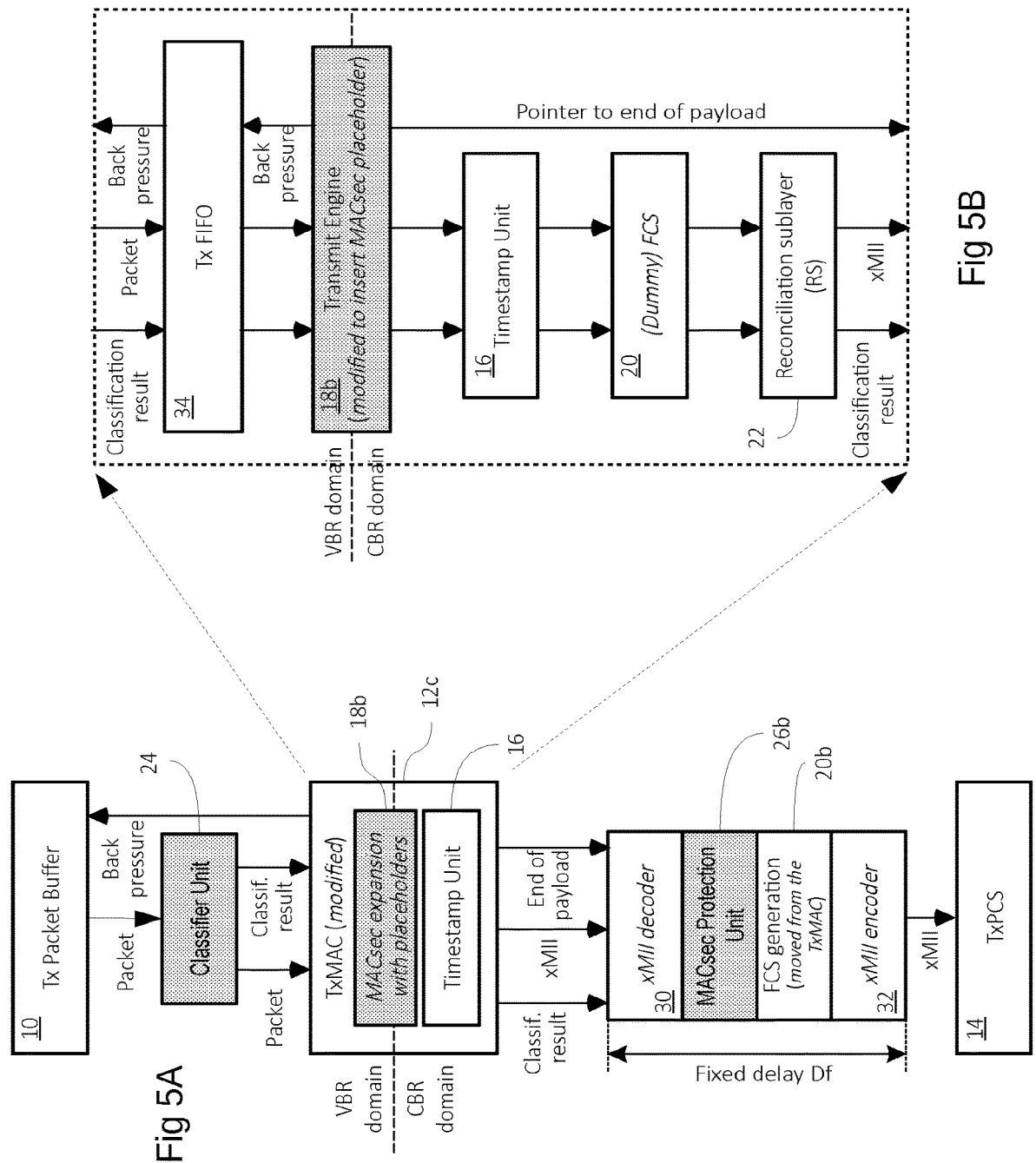

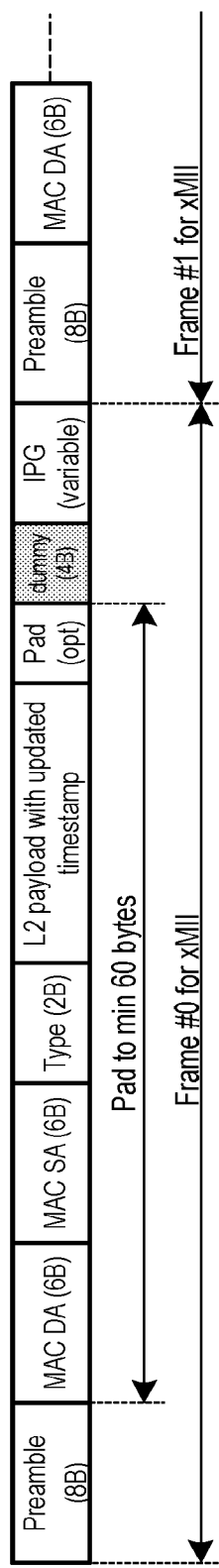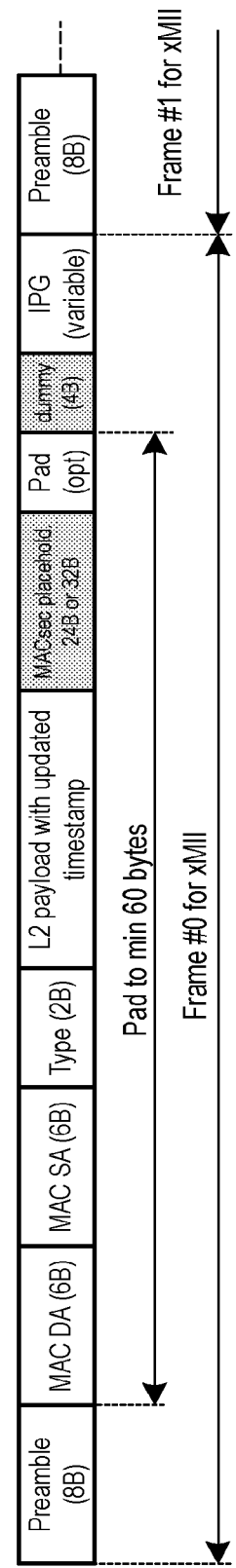
Fig 6A
Fig 6B

NETWORK INTERFACE WITH TIMESTAMPING AND DATA PROTECTION

CROSS REFERENCE TO RELATED APPLICATION

This application is a continuation application of U.S. patent application Ser. No. 16/552,919, filed Aug. 27, 2019, which claims priority to European Application No. 18191268.4, filed Aug. 28, 2018, the contents of all of which are incorporated herein by reference in their entirety herein.

TECHNICAL FIELD

The present disclosure relates to network interfaces, and more specifically to interfaces implementing both packet timestamping according to IEEE-1588 and MAC layer security, such as defined by IEEE-802.1AE, also known as MACsec.

BACKGROUND

According to the Precision Time Protocol (PTP), defined by the IEEE-1588 standards, timestamps accurately reflecting network packet departure times may be inserted in the packets.

In order to ensure accuracy, timestamps are preferably inserted by the network interface at a point of the data path where the latency remaining up to the network physical layer can be determined as accurately as possible. Indeed, the timestamps should reflect the times at which the packets egress into the network.

FIG. 1A is a block diagram of a typical network transmission interface implementing the PTP, such as disclosed, for instance, in U.S. Pat. No. 9,929,928. A buffer 10 receives outgoing data in the form, for instance, of Ethernet frames. The frames are processed by a transmission media access control (MAC) unit 12. A flow control mechanism is implemented between the buffer and the MAC unit 12 through a back-pressure signal. The processed frames are transferred to a physical coding sublayer (PCS) 14, for instance over a media-independent interface (xMII). A PTP timestamp unit 16 is usually included within the MAC unit, as shown.

FIG. 1B is a block diagram of a straightforward implementation of a MAC unit including the timestamp unit. The MAC unit includes, in sequence, a transmission engine 18, a frame check sequence (FCS) generation and appending unit 20, and a reconciliation sublayer (RS) 22. The timestamp unit 16 is located upstream the FCS unit, because the FCS values are calculated based on the timestamp values.

The transmission engine 18 encapsulates the frames with various fields pertaining to the physical layer. The RS unit 22 implements the xMII interface for communicating with downstream units, in practice the PCS.

FIG. 2A is an exemplary network data structure without timestamping as produced by the MAC unit 12 on the xMII interface. The top of FIG. 2A depicts an exemplary Ethernet frame as received in the packet buffer 10. The frame may conventionally include a MAC destination address field (6 bytes), followed by a MAC source address field (6 bytes), a type field (2 bytes), and an L2 payload field of variable length.

The bottom of FIG. 2A depicts the Ethernet frame as processed for transmission. Changes are illustrated by gray fields. The frame is preceded by an 8-byte preamble and followed by an optional padding field, a 4-byte frame check sequence (FCS) field, and a variable but of deterministic length inter-packet gap (IPG). A next processed frame starts at the end of the IPG.

The transmit engine 18 is in charge of appending the preamble and padding fields to the Ethernet frame. The padding field is optional in that it is used when the frame is less than 60 bytes long, to extend the frame length to 60 bytes. The FCS field is calculated over the entire frame and the padding field, and appended by the unit 20. The IPG field is appended by the reconciliation sublayer 22.

FIG. 2B is an exemplary processed frame structure with timestamping, based on the same Ethernet frame as in FIG. 2A. The timestamp is evaluated and inserted in the L2 payload by the timestamp unit 16. The FCS value, calculated after, thus takes the L2 payload modified by the timestamp into account.

In the configuration of FIGS. 1A and 1B, the timestamp unit 16 is conveniently located, because the delay between the time stamp unit and the PCS (the packet egress point) is fixed and determinable, whereby the timestamps can be accurately calculated by adding a fixed delay.

FIGS. 3A and 3B are exemplary processed frame structures using timestamping and MAC layer security, for instance MACsec, as they would be produced on the xMII interface. MACsec may be configured to implement several modes based on a classification of the frame.

A first mode is bypass, meaning MACsec is disabled and has no influence on the frame, i.e. the produced processed frame is similar to that of FIG. 2B.

In a second mode (integrity protection) and a third mode (combined confidentiality and integrity protection), the MACsec process expands the frame with an 8-byte security tag (SecTAG) optionally extended by an 8-byte secure channel identifier (SCI), placed between the MAC source address field and the type field, and a 16-byte integrity check value (ICV) placed between the payload field and the padding field.

The ICV is a signature calculated using cryptography over the Ethernet frame including the security tag. The FCS is then calculated over the Ethernet frame including the security tag, the ICV and the padding field. The purpose of the ICV, using complex cryptography calculations, is to detect tampering with the frame, whereas the purpose of the FCS, using simple calculations, is to detect transmission errors.

FIG. 3A illustrates a frame as produced using the integrity-only mode. The frame is expanded with the security tag and the ICV, but the payload and type fields remain intact.

FIG. 3B illustrates a frame as produced using the combined confidentiality and integrity mode. The frame is expanded with the security tag and the ICV, and both the type and payload fields are merged and encrypted in one field.

Implementing MACsec with timestamping introduces complications in determining the timestamps accurately. Indeed, MACsec involves signing and optionally encrypting frame payloads in which the time stamps have been inserted beforehand, whereby encrypting or signing can only be performed downstream from the timestamping. Moreover, MACsec processing adds a variable delay between the timestamping and the egress point, which is difficult to evaluate accurately at the time the timestamps need to be inserted.

FIG. 4 is a block diagram of a network interface as disclosed in U.S. Pat. No. 9,929,928 implementing both timestamping and MACsec. In comparison to FIG. 1A, the timestamp unit 16b is removed from the MAC unit 12b and placed upstream the MAC unit. A classifier unit 24 is located between the packet buffer 10 and the timestamp unit 16b. A MACsec protection unit 26 is located between the timestamp unit 16b and the MAC unit 12b.

The classifier unit 24 and the protection unit 26 (in gray) together implement the MACsec protocols. The classifier 24 determines a security classification based on information contained in a current frame, for instance, whether the current frame should be encrypted and signed, only signed, discarded or should pass through as is. Depending on the classification, the frame may be expanded with the security tag and ICV fields in the protection unit 26, thus introducing a first variable delay downstream from the timestamp unit.

By placing the classifier before the timestamp unit, the classification result can be used by the timestamp unit to account for the frame expansion performed downstream by the protection unit 26. Although the variable latency caused by frame expansion is deterministic, there are other latencies that are less deterministic, such as introduced by the complex cryptography calculations in the protection unit 26 and by flow control between the units.

In order to improve timestamp accuracy, U.S. Pat. No. 9,929,928 provides the timestamp unit 16b with a departure-time prediction engine 28 that takes feedback from the xMII interface output. The prediction engine implements a complex algorithm that does not systematically predict delays accurately.

SUMMARY

A network transmission interface is generally provided, comprising within an egress data path, a physical coding sublayer (PCS) operating in a constant bitrate domain for transmitting data frames on a network link; a timestamp unit configured to insert timestamps in payloads of the frames; a transmission media access control (MAC) unit located at a boundary between the constant bitrate domain and a variable bitrate domain, configured to receive the frames at a variable bitrate, encapsulate the frames, and provide the encapsulated frames at a constant bitrate; a MAC layer security unit located downstream from the timestamp unit, configured to sign and optionally encrypt the payloads and expand each frame with a security tag and an integrity check value (ICV). The timestamp unit and the MAC layer security unit both operate in the constant bitrate domain.

The transmission MAC unit may include a transmit engine configured to expand each frame upstream the timestamp unit with a placeholder accounting for the combined size of the security tag and the ICV, and the MAC layer security unit may be configured to use the placeholder for inserting the security tag and the ICV after encrypting or signing the payload.

The transmission MAC unit may be configured to encapsulate each frame with a dummy frame check sequence (FCS), and the interface may further comprise an FCS generation unit downstream from the MAC layer security unit configured for replacing the dummy FCS with an effective FCS.

The timestamp unit may be included in the transmission MAC unit, and the transmission MAC unit may be configured for outputting data through a media-independent interface (xMII), the network interface further comprising downstream from the transmission MAC unit an xMII decoder located upstream the MAC layer security unit; and an xMII encoder located downstream from the FCS generation unit, configured to supply the PCS.

The interface may comprise a classifier unit located upstream the transmission MAC unit, configured to determine a security classification for each frame among one of MACsec encapsulation, discard and bypass, and convey the resulting classification down to the MAC layer security unit, wherein the transmit engine performs expansion with the placeholder only when the resulting classification is set to MACsec encapsulation.

A method is generally provided for timestamping and protecting network frames at a MAC layer upon transmission, comprising the steps of receiving each frame at a variable bitrate; pre-expanding a current frame with a placeholder accounting for the size of security tags used by a MAC layer protection mechanism; forwarding the pre-expanded current frame at a constant bitrate; inserting a timestamp in a payload of the pre-expanded current frame; and protecting the pre-expanded current frame while using the placeholder for inserting the resulting security tags.

The method may comprise the further steps of appending a dummy frame check sequence (FCS) to the pre-expanded current frame after inserting the timestamp; and updating the dummy FCS after the protecting step.

BRIEF DESCRIPTION OF DRAWINGS

Other advantages and features will become more clearly apparent from the following description of particular embodiments, which are for exemplary purposes only and represented in the appended drawings, in which:

FIGS. 1A and 1B, previously described, are block diagrams of a conventional network transmission interface implementing timestamping;

FIG. 2A, previously described, is an exemplary network data structure without timestamping nor MAC layer security;

FIG. 2B, previously described, is an exemplary network data structure with timestamping but without MAC layer security;

FIGS. 3A and 3B, previously described, are exemplary network data structures with timestamping and MAC layer security;

FIGS. 5A and 5B are block diagrams of an embodiment of a network transmission interface implementing timestamping and MAC layer security and offering improved timestamp accuracy;

FIG. 6A is an exemplary network data structure with timestamping and MAC layer security set to bypass mode, as output from the modified MAC unit of FIG. 5B; and FIG. 6B is an exemplary network data structure with timestamping and MAC layer security set to encryption or signing mode, as output from the modified MAC unit of FIG. 5B.

DETAILED DESCRIPTIONS

Figure 4:
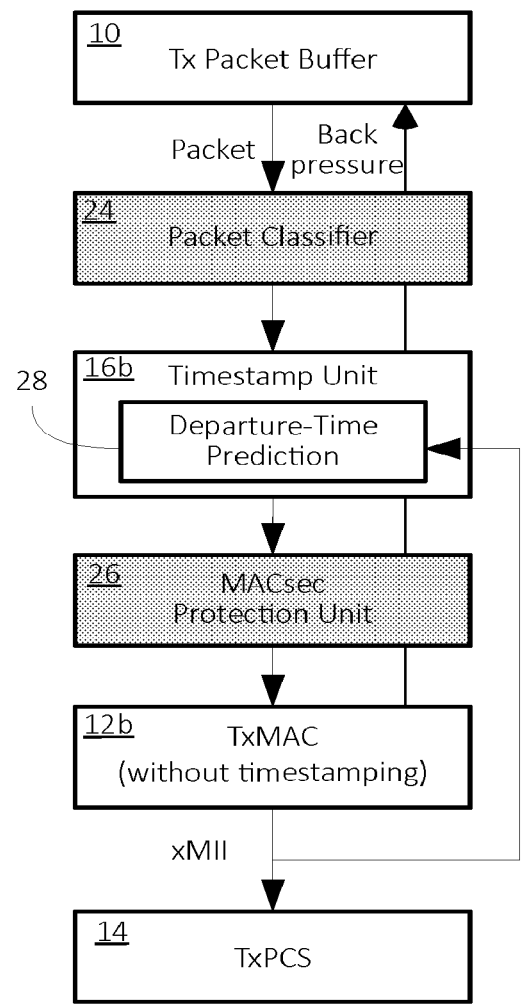
FIG. 4, previously described, is a block diagram of a conventional network transmission interface implementing both timestamping and MAC layer security.

It has been noted that in a network transmission interface such as that of FIGS. 1A, 1B and 4, some units operate in a variable bitrate domain (the units upstream the MAC unit), while other units operate in a constant bitrate domain (the units downstream from the MAC unit).

In the variable bitrate domain, frames may arrive in non-contiguous and irregular bursts due to processing delays and resource congestion, and they may be expanded arbitrarily, whereby buffering is needed between the units to ensure each unit always has data available for processing.

Buffering introduces flow control mechanisms causing difficulties in predicting transmission delays.

In the constant bitrate domain, the units are synchronized so that data flows through them at a known rate, corresponding to the rate of the network link, whereby transmission delays are fixed or determinable with a sufficient level of accuracy.

A boundary between the variable and constant bitrate domains may be defined as soon as the frames have achieved their final size, or when their size may still vary by a fixed known quantity that can be absorbed synchronously by the downstream units. In FIG. 1B, the boundary may be the transmit engine 18, although fields are still appended downstream by units 20 (FCS) and 22 (IPG). The size of the FCS and IPG fields is known by the time the packet exits the transmit engine 18, whereby the units downstream from the transmit engine 18, in particular the timestamp unit 16, can be designed to be synchronous. Thus, the timestamp unit 16 operates in the constant bitrate domain and all delays downstream are known or determinable.

In the conventional structure of FIG. 4, where MAC layer security (MACsec) is combined with timestamping, the MAC unit 12b was moved downstream from the MACsec unit 26, because the MAC unit 12b implements, as a standard, operations that need to be performed after the MACsec processing (such as the FCS generation and the xMII interfacing). As a consequence, the timestamp unit 16b is located in the variable bitrate domain.

In the embodiments described herein, a structure implementing both timestamping and MAC layer security is implemented, to keep the timestamp unit in the constant bitrate domain.

FIG. 5A is a block diagram of an embodiment of a transmission network interface achieving this goal. Same reference numerals as in the previous figures designate similar elements. Reference numerals bearing a letter suffix designate modified features from the previous figures. Text in italics designates new features. Elements in gray participate in MACsec functions.

In comparison to FIG. 4, the MAC unit 12c is located between the classifier unit 24 and the MACsec protection unit 26b. Like in FIG. 1A, the MAC unit 12c includes the timestamp unit 16. The boundary between the variable bitrate (VBR) domain and the constant bitrate (CBR) domain is typically (FIG. 1B) at the transmit engine 18 of the MAC unit, as previously mentioned, meaning the timestamp unit 16 and the downstream protection unit 26b are located in the CBR domain. The transmit engine 18b of the MAC unit is modified to pre-expand the frames, based on the classification results provided by unit 24, with placeholders that will later receive the MACsec tags, i.e. the security tag with the optional SCI, and the ICV.

With such a configuration, the pre-expanded frames issued by the transmit engine 18b can be processed downstream fully in the CBR domain. The protection unit 26b is modified to no longer cause expansion, but to simply use each placeholder for the calculated MACsec tags, while processing the type field and the payload as usual. As a result, timestamping and all further downstream processing occur in the CBR domain, where delays are fixed and determinable.

Referring back to FIG. 1B, the MAC unit conventionally generates and appends an FCS at 20, FCS which is normally calculated over the MACsec transformed frame (FIGS. 3A, 3B). In FIG. 5A, the FCS generation is removed from the MAC unit to be located at 20b downstream from the protection unit 26b.

For purposes of design reuse and maintaining compatibility with existing building blocks, the MAC unit 12c may be based on units of conventional structure, such as those of FIG. 1B, which are minimally modified or simplified to implement the current process, as depicted in FIG. 5B, described later.

Additional elements shown in FIG. 5A are provided to adapt the interface structure to such a minimally modified MAC unit.

The MAC unit 12c typically produces data in xMII format, which is not adapted for processing by conventional MACsec and FCS units. An xMII decoder 30 is thus provided downstream from the MAC unit 12c, to reconvert the data into an Ethernet frame format that can be processed by typical MACsec and FCS units. An xMII encoder 32, similar to the reconciliation sublayer 22, is provided downstream from the FCS unit 20b to produce an output that a standard MAC unit would produce for the PCS 14. Of course, the xMII decoder and encoder 30, 32 add delays to the dataflow after the timestamping event. However, the decoder and encoder operate in the CBR domain, whereby the delays are fixed and can be determined at the time the timestamps are inserted.

The MAC unit 12c is configured to propagate the classification result from the classifier unit 24 to the MACsec protection unit 26b, as shown.

A dataflow on an xMII interface is synchronous with the bitrate of the network link, whereby, in FIG. 5A, the dataflow exiting the MAC unit 12c is in principle synchronous with the dataflow entering the PCS 14. This requirement constrains the units 30, 26b, 20b and 32 to operate together to introduce a fixed delay Df in the dataflow, as noted on FIG. 5A. This constraint is achievable by pipelining the units and, in particular, by designing the MACsec protection unit 26b so that all frames, even those in "bypass" mode, transit through it. When the protection unit 26b receives a bypass frame, it is set to a transparent mode where the frame goes through the various stages of the protection process, while the actual protection processing is turned off. This ensures that all frames bear the same delay through the protection unit 26b, which unit can introduce the most time variation in the process.

With such a configuration, the timestamps generated by the unit 16 may be compensated by the fixed delay Df, and, in some implementations, also by a variable but determinable delay introduced by a conventional flow control mechanism between the PCS 14 and the MAC unit 12c, such as would be the case in the structure of FIG. 1A.

The placeholders appended by the transmit engine 18b are a non-standard factor in the data flow preceding the MACsec unit 26b. In an embodiment, the placeholders may be appended after the payload fields, in which case each placeholder may be processed throughout the MAC unit 12c as if it was part or an extension of the corresponding payload. The transmit engine 18b may be configured to identify the end of the initial payload by propagating, as shown, an "end of payload" pointer to the downstream units that require the length of the initial payload, especially the MACsec protection unit 26b. The padding added by the transmit engine 18b is based on the extended payload.

FIG. 5B is a block diagram of an embodiment of a MAC unit designed to reuse existing building blocks, as previously mentioned. Since the MAC unit is placed downstream from another processing unit (the classifier unit 24) in the VBR domain, it includes a buffer (FIFO) 34 at its input to absorb the processing and transmission delays of the classifier unit 24. The buffer 34 is followed by the transmit engine 18b, modified, as mentioned, to append placeholders for the MACsec tags based on the classification result for each frame. If the classification is "bypass", no placeholder is appended.

As previously mentioned, when a placeholder is appended after the payload, the transmit engine 18b identifies the end of the payload in a pointer that is propagated to the downstream units that require it.

The timestamp unit 16, FCS unit 20, and reconciliation sublayer 22 may be pre-existing versions, such as those of FIG. 1B, that can operate on the placeholder-extended payload without need of the end of payload pointer.

The timestamp unit 16 uses a payload header to locate the position of the timestamp field in the payload, whereby the length of the payload is not needed.

The FCS value generated by the FCS unit 20 is a dummy value in that it has no meaning at this stage, when MACsec is implemented. This has no importance, since the FCS is updated downstream by unit 20b (FIG. 5A) with the correct value. The FCS unit 20 may thus be a simplified version that just appends a fixed dummy value, for instance all zeroes, without performing any calculation to save area and power. The dummy FCS is appended at the end of the frame, which operation requires no knowledge of the length of the payload, because the end of the frame is identified by an "end-of-frame" character.

The RS unit 22 then implements the IPG, which only requires knowledge of the end of the frame.

FIGS. 6A and 6B are exemplary network data structures as output from the modified MAC unit of FIG. 5B. Differences with conventional data structures are shown in gray fields.

In FIG. 6A, the classifier unit 24 has determined the bypass mode, and indicates this in the classifier results propagated to the downstream units. Compared to the frame structure of FIG. 2B, the only difference is that the FCS field contains a dummy value. No placeholder is appended by the transmit engine 18b.

Downstream, the MACsec protection unit 26b is inactive in response to the classification result, producing no data for the absent placeholders. The FCS unit 20b updates the FCS field, producing the frame structure of FIG. 2B for the PCS 14.

In FIG. 6B, the classifier unit 24 has determined a MACsec encapsulation (with integrity-only or integrity and confidentiality mode), and indicates this in the classifier results propagated to the downstream units. The frame structures at this stage are the same, with or without confidentiality. Compared to the frame structure of FIG. 3A, the FCS field again contains a dummy value, and a 24 or 32-byte placeholder is appended after the payload by the transmit engine 18b. The size of the placeholder is determined by the classifier result. The placeholder is arbitrary data, for instance all zeroes.

Downstream, the MACsec protection unit 26b is enabled in response to the classification result. The MACsec unit reorganizes the type, payload and placeholder fields with the security tag and ICV, as required by the classification result. The FCS unit 20b updates the FCS field subsequently.

In integrity-only mode, the frame structure of FIG. 3A is produced for the PCS 14, where the range with the type, payload and placeholder fields is replaced, in sequence, by the security tag, the type field, the payload, and the ICV.

In combined confidentiality and integrity protection mode, the frame structure of FIG. 3B is produced for the PCS 14, where the range with the type, payload and placeholder fields is replaced, in sequence, by the security tag, the encrypted type field and payload, and the ICV.

What is claimed is:

1. A network transmission interface, comprising:
   a transmission media access control (MAC) unit configured to receive data frames at a variable bitrate, encapsulate the data frames, and output the encapsulated data frames at a constant bitrate;
   a timestamp unit configured to insert timestamps in payloads of the data frames; and
   a MAC layer security unit located downstream from the transmission MAC unit.

2. The network transmission interface of claim 1, wherein the transmission MAC is configured to operate at a boundary between a variable bitrate domain and a constant bitrate domain.

3. The network transmission interface of claim 2, wherein the MAC layer security unit is configured to generate a signature and optionally encrypt the payloads and expand each of the data frames with a security tag and an integrity check value (ICV).

4. The network transmission interface of claim 3, wherein the transmission MAC unit comprises the timestamp unit and a transmit engine configured to expand each of the data frames upstream the timestamp unit with a placeholder accounting for a combined size of the security tag and the ICV, and wherein the MAC layer security unit is configured to use the placeholder to insert the security tag and the ICV after encrypting or signing a respective payload.

5. The network transmission interface of claim 2, further comprising:
   a physical coding sublayer (PCS) configured to operate in the constant bitrate domain to transmit the data frames on a network link.

6. The network transmission interface of claim 1, wherein the timestamp unit and the MAC layer security unit are configured to operate in the constant bitrate domain.

7. The network transmission interface of claim 1, further comprising:
   a classifier unit located upstream the transmission MAC unit.

8. The network transmission interface of claim 1, wherein the transmission MAC unit is configured to encapsulate each of the data frames with a temporary frame check sequence (FCS).

9. The network transmission interface of claim 8, comprising:
   an FCS generation unit located downstream from the MAC layer security unit and configured to replace the temporary FCS with an effective FCS.

10. The network transmission interface of claim 9, further comprising downstream from the transmission MAC unit:
    a media-independent interface (xMII) decoder located upstream the MAC layer security unit; and
    an xMII encoder located downstream from the FCS generation unit.

11. The network transmission interface of claim 1, comprising a classifier unit located upstream the transmission MAC unit, the classifier unit configured to determine a security classification for each of the data frames.

12. A method, comprising:
    receiving, by a transmission media access control (MAC) unit, data frames at a variable bit rate;
    inserting a timestamp in a payload of a current frame of the data frames; and providing, to MAC layer security unit located downstream of the transmission MAC unit, the current frame comprising the timestamp.

13. The method of claim 12, wherein the transmission MAC is configured to operate at a boundary between a variable bitrate domain and a constant bitrate domain.

14. The method of claim 13, wherein inserting the timestamp in the payload of the current frame of the data frames is performed by a timestamp unit operating in the constant bitrate domain.

15. The method of claim 14, wherein the transmission MAC unit comprises the timestamp unit.

16. The method of claim 12, wherein the MAC layer security unit is configured to generate a signature and optionally encrypt payloads and expand each of the data frames with a security tag and an integrity check value (ICV).

17. The method of claim 12, wherein the data frames received by the transmission MAC unit are associated with a classification result of a plurality of classification results based on a security classification.

18. The method of claim 17, further comprising:
determining whether the classification result associated with the data frames satisfies the security classification related to enhancing security of transmission of the data frames;
responsive to determining that the classification result satisfies the security classification, pre-expanding, by the transmission MAC unit, the current frame of the data frames with a placeholder accounting for a size of security tags used by the MAC layer security unit to implement a MAC layer protection mechanism; and
forwarding, by the transmission MAC unit, the pre-expanded current frame at a constant bitrate for the insertion of the timestamp.

19. The method of claim 18, wherein the placeholder further accounts for a size of an integrity check value (ICV) used by the MAC layer security to unit to implement the MAC layer protection mechanism.

20. The method of claim 18, further comprising:
subsequent to inserting the timestamp, appending a temporary frame check sequence (FCS) to the pre-expanded current frame.

* * * * *